United States Patent [19]
Robertson

[11] Patent Number: 5,127,260
[45] Date of Patent: Jul. 7, 1992

[54] METHOD OF TESTING THE STRENGTH OF SEAMS IN PLASTIC SHEETS

[76] Inventor: William L. Robertson, P.O. Box 1267 Station T, Calgary, Alberta, Canada, T2H 2M8

[21] Appl. No.: 641,122

[22] Filed: Jan. 14, 1991

[51] Int. Cl.⁵ ............................................. G01M 3/36
[52] U.S. Cl. ................................... 73/37; 73/150 A
[58] Field of Search ............................. 73/37, 150 A

[56] References Cited

U.S. PATENT DOCUMENTS

| | | | |
|---|---|---|---|
| 2,222,079 | 11/1940 | Larson | 73/37 |
| 2,453,338 | 11/1948 | Pajak | 73/37 |
| 2,694,924 | 11/1954 | Matlock et al. | 73/37 |
| 2,842,957 | 7/1958 | Bacon, Jr. | 73/37 |
| 3,285,056 | 11/1966 | Mattivi | 73/37 |

*Primary Examiner*—Hezron E. Williams
*Assistant Examiner*—Joseph W. Roskos
*Attorney, Agent, or Firm*—Shlesinger, Arkwright & Garvey

[57] ABSTRACT

Current state-of-the-art requires welded seams between adjacent sheets of material, e.g. polyethylene to be tested for leaks using vacuum, ultrasonic or low pressure air techniques. In general, the devices used are somewhat complicated and consequently expensive. A relatively simple method of determining the strength and integrity of a welded seam between layers of plastic, which are interconnected by welding to form a sealed passage including the step of injecting air or another gas into the passage under sufficient pressure that any weakness in the seam results in a visible distortion or total separation of the plastic in the area of such weakness.

6 Claims, 2 Drawing Sheets

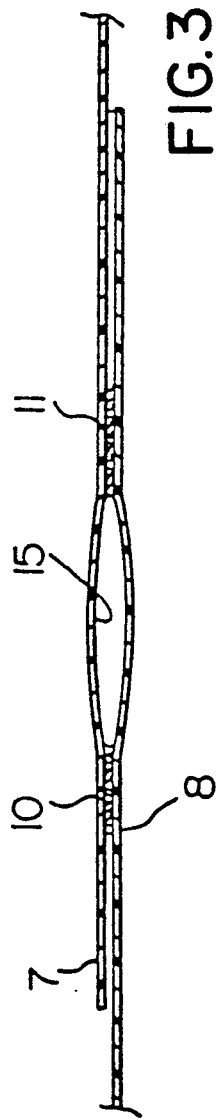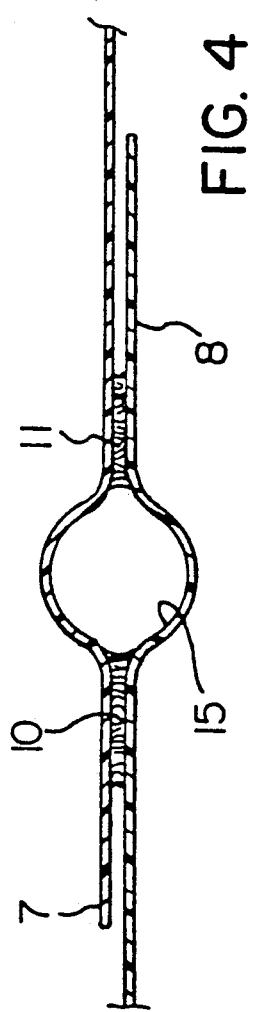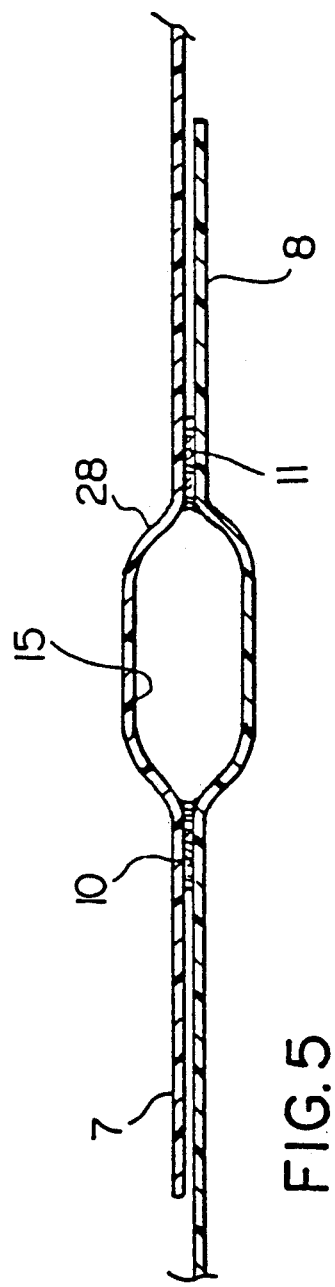

METHOD OF TESTING THE STRENGTH OF SEAMS IN PLASTIC SHEETS

BACKGROUND OF THE INVENTION

This invention relates to a method of testing seams between adjacent layers of plastic material, and in particular to a method of testing parallel, welded seams between adjacent layers of polyethylene.

During the past few years, because of environmental concerns, there has been a tremendous increase in the use of impervious sheet material for containing waste. The sheet material most suitable at this time for containing waste liquids is polyethylene which is extremely inert to most chemicals.

Because polyethylene is inert, the material cannot be glued, and all seams must be welded, i.e. the overlapping plastic sheets are partially melted and thus fused together. Obviously, the finished product is only as good as the welded seams.

There are two basic welding techniques currently in use, extrusion welding and heat fusion welding. Both welding techniques are capable of producing quality welds having strengths equal to that of the basic plastic material. By the same token, incompetent operators, inferior equipment or adverse conditions can result in flawed welds which are weaker than the plastic.

It is currently required that welded seams between adjacent sheets of material, e.g. polyethylene, be tested for leaks using vacuum, ultrasonic or low pressure are techniques.

In the conventional method of testing, the quality of the weld is determined by cutting out coupons from the weld seam for "peel" testing on a tensometer. There are however two major flaws to this method. Firstly, by cutting out the coupon, a hole in a good seam is created and future leakage at the resulting patch is a distinct possibility. Secondly, the quality of the weld is only checked at the point where the coupon is removed, the rest of the seam is assumed to be flawless.

A need exists therefore for a relatively simple method of determining the strength and integrity of a welded seam along the entire length of the seam.

OBJECT(S) OF THE INVENTION

The object of the present invention is to meet the above defined need by providing a relatively simple method of stress testing a seam between adjacent layers of a plastic material, without removal of sections of the seam and subsequent patching.

BRIEF SUMMARY OF THE INVENTION

Accordingly, the present invention relates to a method of testing a dual welded seam between adjacent, overlapping layers of a plastic material, the layers being interconnected by welding to form a sealed passage, said method comprising the step of injecting gas into said passage under sufficient pressure that any weakness in the seam results in distortion of the plastic in the area of such weakness, or total separation of one of the welds with subsequent total loss of pressure.

BRIEF DESCRIPTION OF THE DRAWINGS

The invention will be described in greater detail with reference to the accompanying drawings, which illustrate a preferred embodiment of the invention, and wherein:

FIG. 3 is a schematic, cross-sectional view of the seam shown in FIG. 2, prior to pressurizing;

FIG. 4 is a schematic, cross-sectional view of a pressurized seam with no defects; and FIG. 5 is a schematic, cross-sectional view of a pressurized seam, partially separated.

DESCRIPTION OF THE PREFERRED EMBODIMENT

Figure 1:
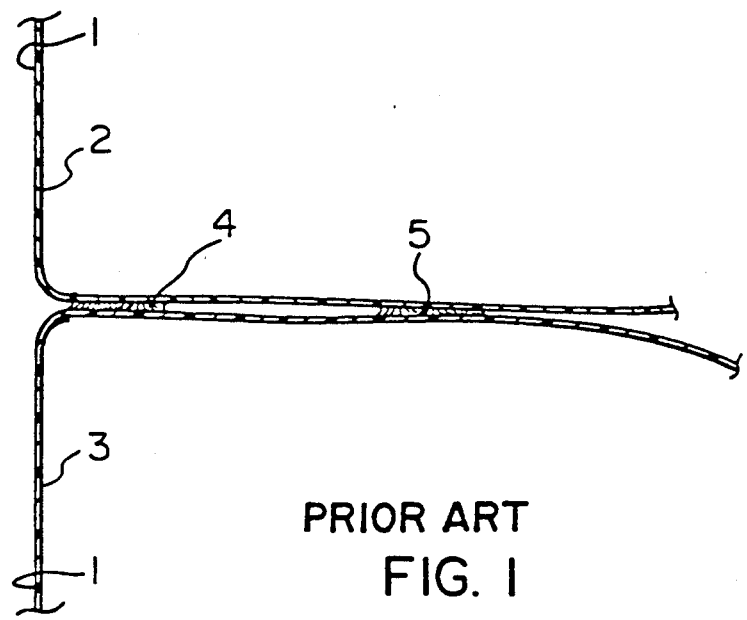
FIG. 1 is a schematic cross-sectional of a welded coupon cut from a seam undergoing a "peel" test in accordance with the prior art.

Conventional stress testing of weld seams is normally carried out on small samples. The so-called "peel" test is performed on samples or coupons which are one inch wide in accordance with A.S.T.M. D 882. A quick check is normally done in the field using a pair of locking pliers. A more accurate test is done using a tension testing machine (not shown) designed to pull the ends 1 of a pair of plastic layers or sheets 2 and 3, which are welded together by parallel spaced apart seams 4 and 5. The test is continued until the material fails. The test of proper welds is that failure of the material occurs outside of the weld area, i.e. the weld is stronger than the material.

The high pressure test of the present invention is intended for use with two elongated sheets, e.g. one thousand feet long plastic sheets 7 and 8 which are welded together along their lengths by two transversely spaced apart weld seams 10 and 11 (FIGS. 3 to 6).

Figure 2:
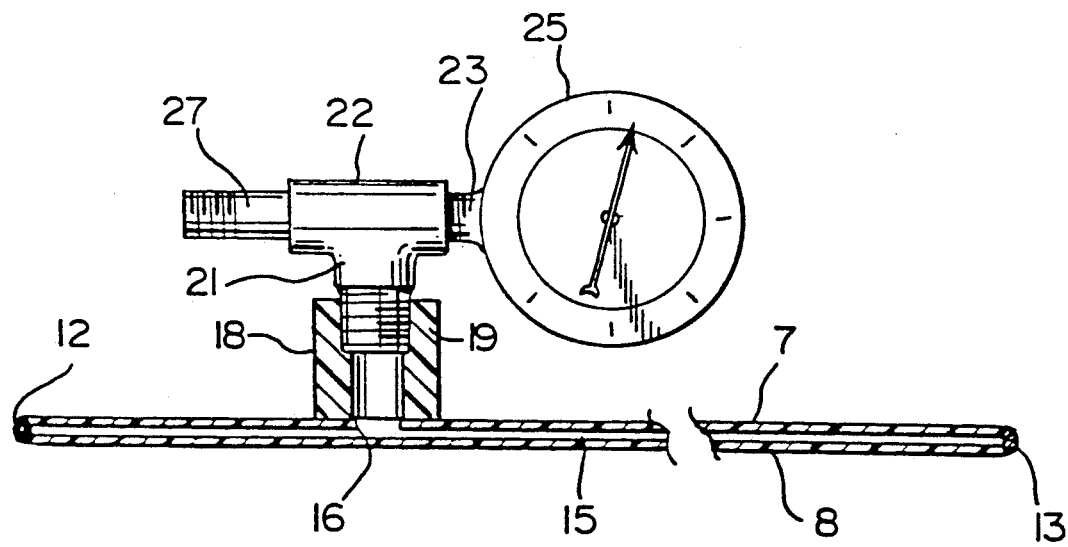
FIG. 2 is a longitudinal sectional view of a dual welded seam of plastic incorporating an apparatus for performing the method of the present invention.

In order to perform the method of the present invention, the ends 12 and 13 (FIG. 2) of the sheets 7 and 8 in the area between the welds 10 and 11 are welded together to form an elongated closed passage 15. An opening 16 is formed in one sheet 7 near one end 12 thereof, and a polyethylene inlet duct 18 is welded to the sheet 7 around the opening 16. The outer end 19 of the inlet duct 18 is internally threaded for receiving a stem 21 of a T-coupler 22 which connects the inlet duct 18 via pipe 23 to a pressure gauge 25, and via pipe 27 to a source of air (not shown) under pressure.

Prior to the stress test, the sheets 7 and 8 in the area of the passage 15 are generally parallel to each other (FIG. 3). When air under pressure is introduced into the passage 15 via the inlet duct 18, stress is created across each of the weld seams 10 and 11, simulating a "peel" test. As best shown in FIG. 4, during testing, the sheets 7 and 8 in the area between the welds 10 and 11 bow outwardly to define a generally cylindrical passage. Under a pressure of at least 1 psi/mil thickness/inch channel width, a sub-standard weld can either blow out completely or partially separate causing a lump 28 (FIG. 5) in the air passage which can easily be detected by visual inspection.

The above-defined method can be applied to virtually any length of uninterrupted weld seam.

What is claimed is:

1. A method of testing a dual seam between first and second sheets of plastic material, comprising:
   a) providing a first sheet of plastic material;
   b) providing a second sheet of plastic material adjacent to and at least partially overlapping the first sheet of plastic material;
   c) heat sealing an overlapping area between the first and second sheets of plastic material to form first and second seams of a dual seam and thereby forming an elongated passageway therebetween;

d) securing a freely movable testing apparatus to one of said first and second sheets of plastic material for injecting pressurized gas into the elongated passageway to cause the elongated passageway to form an elongated balloon in which both the first and second sheets of plastic material expand away from each other and out of the plane of the dual seam; and e) whereby, a failed area of the heat-sealed dual seams results in a deformation visually different from the other areas of the dual seam.

2. A method as defined in claim 1, wherein:
a) said step of securing a freely movable testing apparatus includes a step of welding a gas inlet duct of the apparatus to the one of said first and second sheets of plastic material.

3. A method as defined in claim 1, wherein:
a) said steps of providing first and second sheets of plastic material include supplying sheets of polyethylene.

4. A method as defined in claim 3, wherein:
a) said step of heat sealing includes welding.

5. A method as defined in claim 3, wherein:
a) said step of securing a freely movable testing apparatus includes injecting the pressurized gas at a pressure of at least 1 psi per mil thickness of each sheet of plastic material per inch of passage width between the first and second seams of the dual seam.

6. A method as defined in claim 5, wherein:
a) said step of injecting the pressurized gas comprises injecting pressurized air.

* * * * *